United States Patent [19]

Huber

[11] Patent Number: 5,020,657
[45] Date of Patent: Jun. 4, 1991

[54] DRIVE ROLLER UNIT

[75] Inventor: Thomas Huber, Iffeldorf, Fed. Rep. of Germany

[73] Assignee: Bavaria Cargo Technologie GmbH, Fed. Rep. of Germany

[21] Appl. No.: 530,511

[22] Filed: May 30, 1990

[30] Foreign Application Priority Data

Feb. 21, 1990 [EP] European Pat. Off. ............ 90103340

[51] Int. Cl.$^5$ .............................................. B65G 13/02
[52] U.S. Cl. .................................... 198/782; 198/787; 198/788; 244/137.1
[58] Field of Search ....................... 198/782, 787, 788; 244/137.1

[56] References Cited

U.S. PATENT DOCUMENTS

| | | | |
|---|---|---|---|
| 3,690,440 | 9/1972 | MacPherson | 198/782 |
| 4,792,037 | 12/1988 | Huber | 198/788 |
| 4,949,837 | 8/1990 | Huber | 198/782 |

FOREIGN PATENT DOCUMENTS

882373   7/1953   Fed. Rep. of Germany .

*Primary Examiner*—Joseph E. Valenza
*Assistant Examiner*—Tuan N. Nguyen
*Attorney, Agent, or Firm*—Sughrue, Mion, Zinn, Macpeak & Seas

[57] ABSTRACT

A drive roller unit for driving an article on a conveyor track comprises first and second drive rollers which can be driven in rotation by an electric motor by way of a transmission. The drive rollers are arranged with their axes of rotation in concentric side-by-side relationship and are each driven by the electric motor by way of a respective transmission wheel. The electric motor drives the first transmission wheel while the second transmission wheel is coupled to the first transmission wheel by means of a slipping clutch whose clutch torque is such that the clutch does not slip and the drive rollers thus rotate in the same direction as long as the driven article can move substantially unbraked or unimpeded beyond the drive roller unit, the clutch however slipping if the article is unable to move freely and thus applies a braking force to the second roller, whereby the unit is turned about a vertical axis to re-orient the article for further free movement thereof in a fresh direction.

10 Claims, 4 Drawing Sheets

DRIVE ROLLER UNIT

BACKGROUND

One form of drive roller unit for driving an article on a conveyor track, as disclosed in European patent application No. 89 102 955.5, corresponding to U.S. application USSN 377,971, now U.S. Pat. No. 4,949,837, comprises two drive rollers which can be driven in rotation by an electric motor means by way of a transmission means and which in their drive position are in engagement with the underside of the article to be driven. The two drive rollers are arranged with their axes of rotation substantially transversely with respect to the direction of drive of the article and in juxtaposed relationship in their axial direction, while the transmission means includes a first transmission wheel which is driven by the electric motor means and which drives in rotation the first drive roller, and a second transmission wheel which is coupled to the first transmission wheel and which drives in rotation the second drive roller. The drive rollers are mounted in a holding means which is mounted rotatably about a vertical axis with respect to a base structure of the conveyor track. A drive roller unit of that kind is used for example for driving freight containers which are movable on roller-type and ball-type conveyor tracks, a preferred area of use of such arrangements involving freight loading systems in air freight traffic, in which the containers are transported in an aircraft freight compartment on roller-type or ball-type conveyor tracks, to the intended anchorage locations.

A drive roller unit of simpler construction for use in such a situation for that purpose is to be found for example from U.S. Pat. No. 4,792,037, comprising a single drive roller which is firstly lifted out of a lower rest position by an electric motor means until it reaches a raised operative position in which it bears against the bottom of the article to be driven along on the conveyor track. In that raised position the drive roller is then driven in rotation by the same electric motor means so that it applies to the underside of the article a tangential force which displaces it in a direction substantially normal to the direction of the axis of rotation of the drive roller.

When loading freight containers into aircraft freight compartments, a problem which now arises is that the elongate containers which are frequently longer than the width of the freight compartment of the aircraft must be pushed into the freight compartment with one of their narrow sides leading, through a cargo hatch in the side of the aircraft, and then turned through 90° so that they can be moved along with their longitudinal axis parallel to the longitudinal axis of the aircraft, until they reach the intended anchorage locations. For the purposes of introducing the containers through the cargo hatch and for turning them through 90°, in accordance with the state of the art the floor of the freight compartment was provided for example in the region of the cargo hatch with a ball-type conveyor track which permits the container to be moved in all directions and turned. The ball-type conveyor track includes a large number of drive rollers which can be raised and lowered between a rest position and an operative position and which can be driven in rotation in the operative position. Suitable control by means of complicated electronic control assemblies meant that such an arrangement could be used to pass the container into the cargo hatch and at the same time turned through 90° during that movement. That operation was effected by the individual drive roller units being selectively raised and lowered; in the lowered condition, they performed a rotary movement about a vertical axis while in the raised condition they moved the container forwardly in its turned position.

In practice such an arrangement is not only found to be complicated and expensive but in addition it suffers from the disadvantage of being of high weight, which is undesirable in the context of air freight traffic. It is also found to be susceptible to trouble.

Another procedure employed in particular for containers of smaller size involves manually moving the containers on the ball-type conveyor track which is disposed in the region of the cargo hatch, and manually turning same. Instead of ball-type conveyor tracks, flat conveyor arrangements with directable guide rollers may also be employed.

In all the above-mentioned possible constructions, either a considerable level of expenditure is required or it is necessary to use human labour.

As mentioned above, a drive roller unit with two drive rollers is described in above-indicated U.S. patent application Ser. No. 377,971.

That has two drive rollers which are coaxially arranged in juxtaposed relationship and which are driven by an electric motor means and which are coupled together by way of a differential transmission. The differential idler pinions of the differential transmission are subjected to a braking moment which is so selected that in a first operating condition of the drive roller unit, there is a quasi rigid coupling between the two outputs of the differential transmission, which provides that the two drive rollers rotate in the same direction and at the same speed. In that first operating condition they practically act like a single drive roller, as described in DE-A1-37 24 126. The drive roller unit of the above European patent application remains in that operating condition as long as the reaction forces which are applied to the two drive rollers by the article to be driven do not exceed a magnitude which is predetermined by the braking moments at the differential idler pinions of the differential transmission. Those braking moments are matched to the mass of the articles to be driven and to the resistances to be overcome upon free movement thereof on the conveyor track, in such a way that the drive roller unit remains in the first operating condition referred to above as long as the article to be driven is not subjected to a very severe braking effect by an external force, or blocked in regard to movement in its previous direction of movement. That braking effect automatically occurs for example when the container to be loaded has been moved into the freight compartment through the side cargo hatch to such an extent that, at the side of the compartment in opposite relationship to the side with the cargo hatch, the freight container comes to bear against the side wall of the aircraft or a guide arrangement disposed at that location, and therefore cannot move any further in the previous direction, transversely with respect to the freight compartment.

The braking moments produced at the differential idler pinions in the differential transmission are overcome by the strong braking effect which is applied to the drive roller in that situation, and the previously virtually rigid coupling between the two drive rollers is eliminated. The drive roller unit now automatically changes over into a second operating condition in which the two drive rollers begin to rotate in opposite directions, as occurs at the outputs of a differential transmission, in known manner, when one of the two outputs is locked or subjected to a very strong braking effect.

Thus, in that second operating condition, one of the drive rollers continues to rotate in its previous direction of rotation while the other drive roller begins to stop or rotate backwards. Due to those relatively opposite rotary movements of the drive rollers which continue to be pressed against the underside of the article or conveyor to be moved, a turning moment about a vertical axis is produced; by virtue of the drive roller unit being mounted rotatably about a vertical axis, the turning moment produced results in a corresponding rotary movement which moves the drive roller unit into a fresh angular position in relation to the longitudinal axis of the freight compartment. That rotary movement continues until the drive roller unit occupies a position in which the article can move further along within the freight compartment at least over a certain distance therein without being impeded or while being subjected to a lowerbraking effect; the article thus moves in the direction of forward movement which is now defined by the fresh angular position of the drive roller unit, during which the article is simultaneously rotated somewhat into the new drive direction of the drive roller unit, about the vertical axis. As in that fresh position, the forces which subject the article to a substantial braking effect from outside or which totally prevent the article from moving any further, disappear or are at least reduced, the article applies lower reaction forces to the drive roller unit so that the drive roller unit automatically goes back into its first operating condition in which the two drive rollers rotate in the same forward direction. In that situation, the article to be driven will generally not yet have been turned entirely through 90°. On the contrary, the above-described procedure is repeated, with the article again encountering the freight compartment wall or a corresponding abutment so that the drive roller unit is again caused to pass into the second operating condition and as a result is further rotated about the vertical axis.

That change between the two operating conditions may take place on a number of occasions until the article to be moved is finally turned through a sufficient angle, for example 90°, and can then be unimpededly moved in that fresh position in the longitudinal direction of the freight compartment until it reaches the intended anchorage location.

Therefore the rotary movement of the above-described twin-roller unit is produced automatically by the interplay of the mutually adapted braking moments of the article to be conveyed and the differential pinions of the differential transmission, without any necessity for intervention from the exterior, for example by means of an electronic control arrangement. It will be noted however that that twin-roller unit is of a very expensive construction, by virtue of the differential transmission required, and involves a large number of components, so that not only are its manufacturing costs high, but it is also of a high weight and suffers from a certain susceptibility to trouble.

SUMMARY OF THE INVENTION

An object of the present invention is to provide a drive roller unit which is of a simpler and less expensive construction and which is of lower weight than the prior designs.

Another object of the invention is a drive roller unit for driving an article on a conveyor track, which is automatically responsive to an externally imposed need for a change in the direction of movement of the article while being driven.

Still another object of the invention is a drive roller unit for driving an article on a conveyor track, which is reliable in operation while involving a low maintenance requirement and a compact structure.

These and other objects are attained by a drive roller unit in accordance with the teachings of this invention.

In the configuration in accordance with the invention a first transmission wheel of the unit is either driven directly by the electric motor means or it is driven by the electric motor means by way of a step-down transmission to reduce its speed of rotation, and in turn directly drives the first drive roller. The first transmission wheel is connected by way of a slipping clutch to a second transmission wheel which in turn directly drives the second drive roller.

The configuration in accordance with the invention thus enjoys the advantage that the expensive differential transmission of the above-discussed prior art, which is susceptible to trouble, can be omitted, the slipping clutch used is of a substantially simpler design configuration and is more trouble-free and less expensive to produce, while also being lower in weight.

In operation as long as the article which is resting on the drive roller and which is being driven thereby is more or less freely movable, the first and second drive rollers rotate in the same direction and at the same speed in their first operating condition. However as soon as the article for example encounters the wall of an aircraft freight compartment, which is opposite to the freight compartment cargo hatch, a strong braking moment is applied to the two drive rollers by the article lying thereon. That braking moment is so strong that the second drive roller is braked so strongly that the limit moment of the slipping clutch is exceeded and as a result the second drive roller comes to a stop while the first drive roller continues to rotate in the previous direction of rotation, with the slipping clutch in a slipping condition. As a result the drive roller unit turns in its mounting about its vertical axis so that the drive direction of the article can be easily turned. The article can now be moved along by a small distance in that fresh drive direction, sliding against the freight compartment wall or a guide, and turning about a vertical axis. In that situation, the braking moment applied to the drive roller is so greatly reduced that the drive roller goes back from its second operating condition in which one of the rollers is stationary, into the first operating condition in which the two rollers rotate in the same direction and at the same speed. As soon as the braking effect in respect of the article again becomes too great, the drive roller unit again switches over into the second operating condition in which it again turns about the vertical axis so that the article is then facing in a fresh drive direction which has been turned through an angle.

That change between the two operating conditions may take place a number of times until the article to be conveyed has been turned to the desired extent so that it can then be conveyed further along in the freight compartment, without impediment.

A preferred embodiment provides that the slipping clutch is in the form of a roller friction clutch having a plurality of clutch discs or plates which are rotatable relative to each other and between which is arranged a respective plurality of circumferentially distributed coupling rollers which are each arranged at an angle inclinedly with respect to the radial direction of the clutch plates, wherein the clutch plates and the coupling rollers arranged therebetween are axially pressed together by a spring means. Clutch plates which are in adjacent succession in the axial direction are alternately non-rotatably connected to the first and second transmission wheels respectively. Such a construction is distinguished by enjoying a particularly low rate of wear which must be particularly taken into consideration in the intended purpose of use of the slipping clutch, as, when the drive roller unit is in the second operating condition, the slipping clutch will often be required to slip over a prolonged period of time.

Another advantageous design configuration is one in which the axes of rotation of the drive rollers are parallel to each other, while in a particular embodiment the axes of rotation of the two drive rollers may be in mutually aligned coaxial relationship, with the drive rollers being in the external shape of circular cylinders of the same diameter.

A particularly compact construction can be achieved by the drive rollers being in the form of hollow bodies, with the electric motor means, the transmission means and the slipping clutch disposed in the interior of the drive rollers.

A particularly preferred embodiment, because it is of a very simple design configuration, is one in which the rotor of the electric motor means drives by way of a step-down transmission the first transmission wheel which is in the form of a gear wheel and which meshes with an internally toothed ring gear means on the first drive roller, while the first transmission wheel is connected to the input of the slipping clutch, and wherein the output of the slipping clutch drives the second transmission wheel which is in the form of a gear wheel and which meshes with an internally toothed ring gear means on the second drive roller.

A particular degree of simplification in regard to control is provided in a drive roller unit according to an embodiment of the invention in which, when the electric motor means is switched on, the drive rollers automatically rise from a lower rest position into an upper drive position in which they are in engagement with the underside of the article to be driven.

In another advantageous embodiment, the stator of the electric motor means, which stator is to be connected to the power supply in operation of the unit, is arranged concentrically within the rotatably mounted rotor of the electric motor means, and is non-rotatably and rigidly connected to the holding means. In that way power can be supplied to the electric motor means without an expensive sliding contact arrangement which is required for example in the unit disclosed in above-mentioned European patent application No. 89 102 955.5.

In a preferred embodiment of the invention the electric motor means drives the input of a planetary transmission of which one output drives the first transmission wheel and the second output drives in rotation the roller carrier. It is advantageously provided in that arrangement that the input of the planetary transmission is a sun wheel which is non-rotatably connected to the rotor shaft of the electric motor means, that the one output of the planetary transmission is a planet carrier non-rotatably connected to the first transmission wheel, and that the other output is an internally toothed ring gear means which is non-rotatably disposed on the roller carrier and which represents the crown wheel or ring gear of the planet carrier. That design configuration provides that, when the electric motor means is switched on, the roller drive unit automatically rotates out of the lower rest position into the upper drive position.

Further objects, features and advantages of the invention will be apparent from the following description of preferred embodiments.

DESCRIPTION OF PREFERRED EMBODIMENTS

Figure 1:
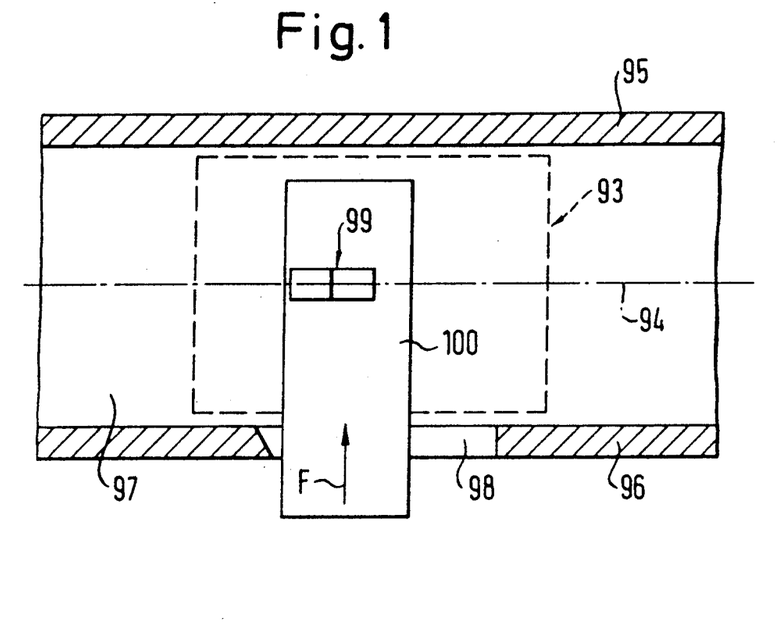
FIGS. 1 and 2 are diagrammatic plan views of a part of an aircraft freight component with a cargo hatch through which a container is moved into the freight compartment.
Figure 2:
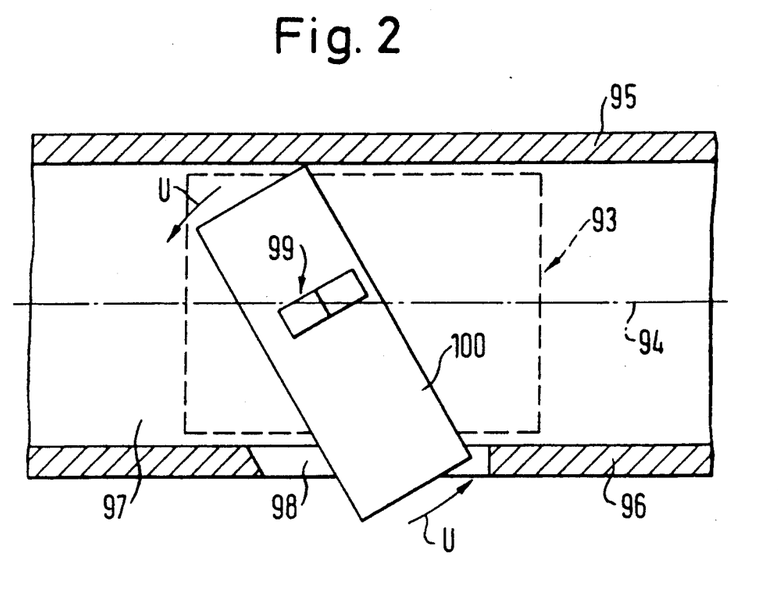

Referring firstly to FIGS. 1 and 2, shown therein is a situation of use of a drive roller unit according to the present invention.

FIGS. 1 and 2 are diagrammatic plan views showing the entrance region of the freight compartment 97 of an aircraft, into which a container 100 is to be loaded. The container 100 is firstly moved up to the aircraft on a roller-type or ball-type conveyor track (not shown) and moved into the cargo hatch 98 of the freight compartment 97. In the region of the cargo hatch 98 the floor of the freight compartment 97 is equipped for example with a ball-type conveyor track or another conveyor track which permits the container 100 to move in all directions. The region of the ball-type conveyor track 93 is shown as a broken-line rectangle in FIGS. 1 and 2.

On the conveyor track 93 the container 100 can firstly be moved perpendicularly to the longitudinal axis of the aircraft into the freight compartment 97, with the application of a comparatively small amount of force, as indicated by the arrow F in FIG. 1. Arranged in the region of the ball-type conveyor track 93 is at least one and preferably a plurality of drive roller units 99 according to the invention, of which at least one is symbolically indicated in FIGS. 2 and 3.

As shown in FIG. 1 therefore the container 100 is firstly moved in the direction indicated by the arrow F with its narrow side leading, that is to say with its longitudinal direction normal to the longitudinal axis 94 of the aircraft, through, the cargo hatch 98 and into the freight compartment 97. However the length of the container 100 in that direction of movement is greater than the width of the freight compartment 97, that is to say it is longer than the internal spacing between the front side wall 96 of the aircraft fuselage, which is at the bottom in FIGS. 1 and 2, and the rear side wall 95, which is at the top. The container 100 must therefore be rotated about one or more vertical axes in the direction indicated by the arrows U in FIG. 2, so that the container can move through the cargo hatch 98 and, in the interior of the freight compartment 97, can be oriented with its longitudinal axis parallel to the longitudinal axis 94 of the aircraft.

Before now describing the way in which the container 100 is both moved into the freight compartment 97 in the direction indicated by the arrow F and also turned through 90° by means of one or more drive roller units 99 according to the invention, the basic structure thereof will first be described with reference to the diagrammatic view in FIG. 3.

Figure 3:
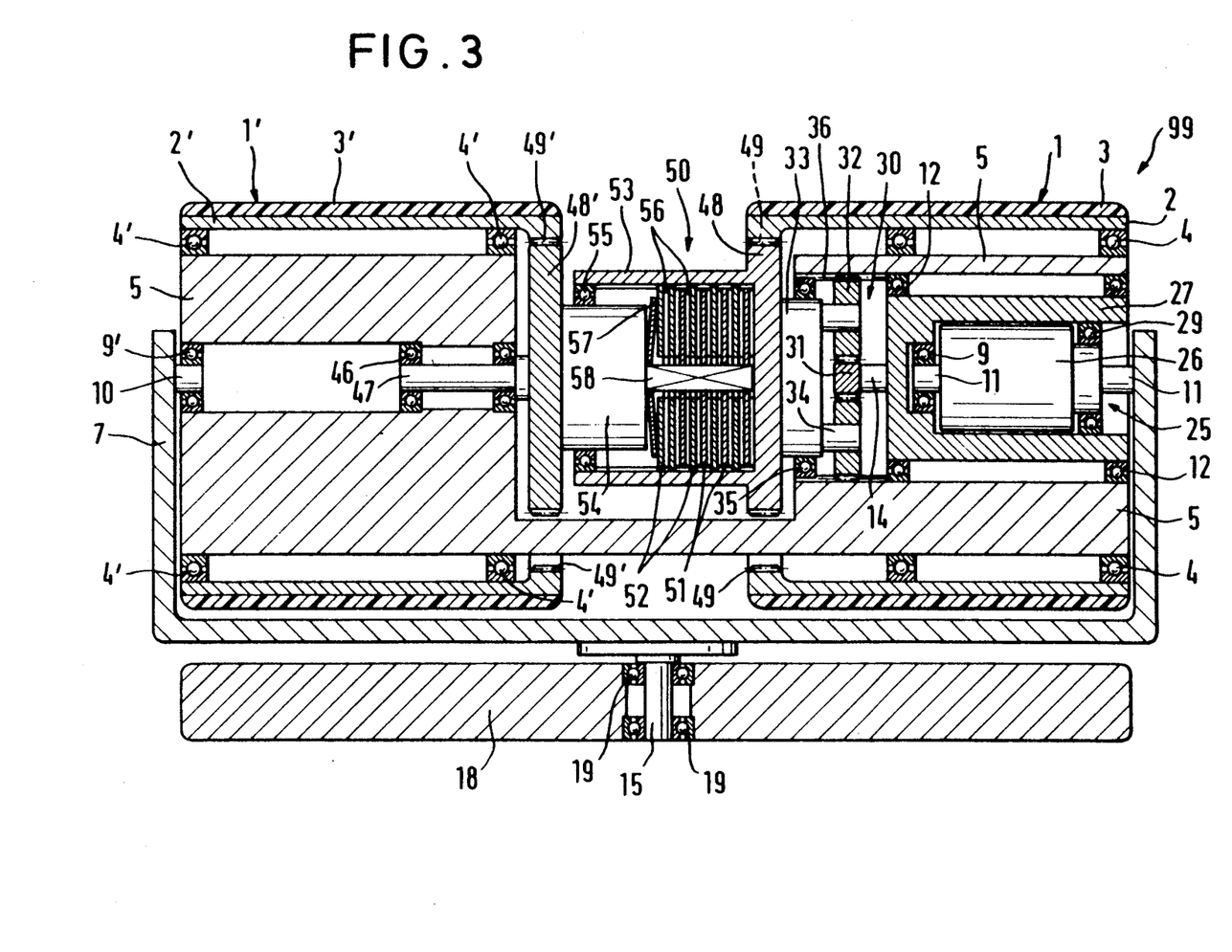
FIG. 3 is a highly simplified and diagrammatic view of a drive roller unit to explain the structure and operating principle in accordance with the present invention.

As shown in the highly diagrammatic view in FIG. 3, the drive roller unit 99 comprises two rollers 1, 1' which are of the same diameter and which are arranged in coaxially juxtaposed relationship. Each drive roller comprises an inner roller body 2 and 2' which is substantially in the form of a hollow cylinder, and a roller casing portion 3 and 3' of wear-resistant elastic material, which covers the outside surface of the roller body 2 and 2'.

The two drive rollers 1 and 1' are mounted rotatably on and in concentric relationship with the circular-cylindrical outside surface of a roller carrier 5, by means of bearings 4 and 4' which, like all bearings referred to hereinafter, may be in the form of rolling bearings, for example needle or ball bearings.

As FIG. 3 shows, the roller carrier 5 is rotatably mounted in a holding means 7 which is of U-shaped configuration in the illustrated cross-section and which is open upwardly. The axial end of the roller carrier 5 which is at the left in FIG. 3 is rotatably mounted by way of a bearing, preferably a rolling bearing 9', on a shaft journal or stub axle 10 which is rigidly connected to the holding means 7. The shaft journal or stub axle 10 is arranged eccentrically with respect to the circular-cylindrical outside surface of the roller carrier 5, on which the drive roller 1' is rotatably mounted. The axis of rotation of the roller carrier 5, relative to the holding means 7, around the stub axle 10, is therefore arranged eccentrically with respect to the axis of rotation of the drive roller 1'.

Passing through the part of the roller carrier 5, which is shown at the right in FIG. 3, is a bore which is concentric with respect to the stub axle 10 and in which an electric motor means 25 is accommodated. The electric motor means 25 includes a stator 26 which is rigidly and non-rotatably connected to the holding means 7 by way of a stator shaft 11 and which includes the field winding of the electric motor means; the field winding is connected by way of fixed leads (not shown) to the power supply source which is connected to the holding means 7. The stator 26 is concentrically surrounded by a rotor 27 which is rotatably mounted on the two axial ends of the stator shaft 11 by means of the bearings 9 and 29 respectively, and can therefore rotate with respect to the holding means.

The outwardly disposed rotor 27 of the electric motor means 25 is also rotatably mounted at the inside wall of the bore which passes through the right-hand half of the roller carrier 5, by means of the bearings 12, so that the rotor 27 can rotate relative to the roller carrier 5.

The center lines or axes of rotation of the stub axle 10 and the stator shaft 26, as well as the axis of rotation of the rotor and the longitudinal axis of the bore which passes through the right-hand part of the roller carrier 5, are aligned with each other and extend parallel but eccentrically with respect to the axis of the circular-cylindrical outside surface of the roller carrier 5 and therewith also the drive rollers 1 and 1' which are mounted on that outside surface.

When therefore the roller carrier 5 is rotated with respect to the holding means 7, then, together with the drive rollers 1 and 1' mounted thereon, it pivots in the manner of an eccentric out of the lower rest position shown in FIG. 3, upwardly into the drive position in which the drive rollers 1 and 1' are urged against the bottom of the article or container 100 to be conveyed.

In the middle of its underside, the holding means 7 is fixedly connected to a vertically downwardly projecting shaft 15 which is mounted rotatably about its vertical axis in a base structure 18 by means of the bearings 19.

The axial end of the rotor 27 of the electric motor means 25, which is shown at the left in FIG. 3, is provided with a rotor shaft 14 which is arranged concentrically with respect to the stator shaft 11 and the left-hand axial end of which non-rotatably carries the sun wheel 31 of a step-down transmission 30 which is in the form of a planetary transmission. The step-down transmission 30 is in the form of a conventional planetary transmission and comprises a plurality of planet wheels 32 which mesh with the sun wheel 31 and which are mounted rotatably on mounting pins 34 of a planet carrier 33, and are in meshing engagement with an internally toothed ring gear means 36 formed in the bore in the roller carrier 5, acting as the crown wheel or ring gear of the planetary transmission. The planet carrier 33 is mounted in the bore in the roller carrier 5 rotatably about an axis of rotation which is concentric with respect to the rotor shaft 14, the stator shaft 11 and the axis of the above-mentioned bore, by means of the bearings 35.

The axial end of the planet carrier 33 which is at the left in FIG. 3 is non-rotatably connected to a first transmission wheel 48 which is in the form of a gear wheel and which is arranged concentrically with respect to the axis of rotation of the planet carrier 33 and which is in meshing engagement with an internally toothed ring gear means 49 formed at the inward side of the hollow-cylindrical drive roller 1.

An internally toothed ring gear means 49' is also formed in the interior of the right-hand axial end of the drive roller 1' which is arranged at the left in FIG. 1. The ring gear means 49' is in meshing engagement with a second transmission wheel 48' which is also in the form of a gear wheel. The second transmission wheel 48' is rotatably mounted by means of its shaft 47 by way of the bearings 46 in a bore in the left-hand part of the roller carrier 5. The axis of rotation of the second transmission wheel and accordingly the shaft 47 are arranged concentrically with respect to the stub axle 10, that is to say once again eccentrically with respect to the outside surface of the roller carrier 5 and with respect to the outside surfaces of the drive rollers 1 and 1'.

Arranged between the first transmission wheel 48 and the second transmission wheel 48' is a slipping clutch 50 which couples the two transmission wheels together in a predetermined fashion and with a predetermined clutch torque.

The slipping clutch 50 is designed in the manner of a roller friction brake or roller friction clutch, as described in detail in DE-A1-37 24 126 which has already been referred to in the opening part of this specification and is hereby incorporated hereinto.

As shown in FIG. 3, the roller friction clutch which serves as the slipping clutch 50 includes a cup-shaped housing 53, the opening of which faces towards the left and the bottom of which is rigidly and non-rotatably connected to the first transmission wheel 48, or is formed in one piece therewith. Extending into the left-hand open end of the housing 53 is a shaft 54 which is rigidly and non-rotatably connected to the second transmission wheel 48'; at its axially righthand end, the shaft non-rotatably carries a square or four-cornered projection portion 58, the 'diameter' of which is substantially smaller than that of the shaft 54 so that a radial abutment shoulder is formed at the right-hand axial end of the shaft 54, at the transition to the portion 58. A plurality of clutch discs or plates 51 and 52 which are aligned radially and axially in parallel juxtaposed relationship are arranged in alternate succession in the right-hand part of the cup-like housing 53, which encloses the projection portion 58.

The first clutch plates or discs 51, that is to say each second one of the successive clutch plates, are arranged non-rotatably but axially displaceably on the projection portion 58 while the clutch plates 52 which are disposed between the clutch plates 51 are nonrotatably and axially displaceably connected at their outer circumference to the housing 53. That non-rotatable and axially displaceable connection to the housing 53 may be made for example by means of a polygonal outside circumference on the clutch plates 52, or by virtue of radially outwardly extending projections which engage into grooves formed in the inside surface of the cup-like housing 53 in the axial direction thereof.

Arranged between each two adjacent clutch plates 51 and 52 is a respective plurality of coupling rollers 56 which are uniformly distributed in the circumferential direction and which are arranged at an inclined angle with respect to the radius of a clutch plate. The entire pack comprising the plurality of clutch plates 51, 52 and the interposed coupling rollers 56 is pressed together by means of a spring arrangement 57 in the form of a diaphragm spring, against the axially right-hand inside wall of the cup-like housing 53.

As roller friction clutches of that kind are known per se, the foregoing brief description will h=sufficient for the man skilled in the art.

It is to be emphasized as an essential aspect that a slipping clutch of that kind operates with an extremely low rate of wear, even when used under conditions involving on-going slipping operation, and in addition, by adjusting the spring biasing effect of the spring means 57, it is possible to achieve a well-defined coupling moment which undergoes practically no change, even upon changes in temperature or when subjected to other outside influences.

As the axes of rotation of the two drive wheels 48 and 48' are arranged in mutually concentrically aligned relationship, it will be appreciated that the shaft 54 on which the left-hand end of the housing 53 of the slipping clutch 50 is rotatably mounted by means of the bearings 55 must also be in concentric relationship with the axes of rotation of the transmission wheels, the stub axle 10 and the stator shaft 11.

For the first operating condition of the drive roller unit, which was mentioned hereinbefore, in which the coupling moment of the friction clutch 50 is not overcome by the forces applied by the container being conveyed, so that the two drive or transmission wheels 48 and 48' rotate in the same direction and at the same speed, the arrangement shown in FIG. 3 may be considered as though the roller bodies 2 and 2' of the two drive rollers 1 and 1' were non-rotatably connected together and driven by way of a single internally toothed ring gear means 49 or 49' by a single transmission wheel 48 or 48' which in turn is driven by the electric motor means 25. In that operating condition the arrangement shown in FIG. 3 corresponds in terms of function to the drive roller unit as described in detail in DE-A1-37 241 126.5, the content of which is incorporated to its full extent into the disclosure of the present application.

In the first operating condition just referred to above, the arrangement in accordance with the invention therefore operates in the same manner as the drive roller unit disclosed in U.S. Pat. No. 4,792,037.

If, starting from the rest position shown in FIG. 3, the supply of power to the stator 26 of the electric motor means is switched on, then a torque is operative between the rotor 27 and the stator 26, as in any other electric motor. Because of the considerable inherent inertia of the drive rollers 1 and 1' or because of the container applying a load thereto, the incipient rotary movement of the rotor 27 provides that, with the planet carrier 33 initially being stationary, being braked in fact by the drive roller 1, the planet wheels 32 begin to rotate and, by virtue of their meshing engagement with the internally toothed ring gear means 36 of the roller carrier, rotate the latter about its axis of rotation so that, because of the eccentric mounting of the roller carrier 5, the drive rollers mounted thereon are pivoted from the lower rest position shown in FIG. 3 into the upper drive or operative position. That pivotal movement comes to an end when the drive rollers 1 and 1' encounter the bottom of the article to be conveyed, and are pressed against the bottom of the article. Because of the weight of the article or container 100, the upwardly directed pivotal movement of the drive rollers 1 and 1' is blocked so that the roller carrier 5 can then not rotate any further. The result of that is that the planet wheels 32 must now necessarily roll against the internally toothed ring gear means 36 which serves as the crown wheel or ring gear of the planetary transmission 30, thereby causing the planet carrier 33 to rotate. The planet carrier 33 is non-rotatably connected to the first transmission wheel 48 which, in meshing engagement with the internally toothed ring gear means 49, now drives the drive roller 1 in rotation. The rotary movement of the drive roller 1 which is pressed against the underside of the container 100 applies a tangential force to the container 100 so that the container begins to move or continues to move in the direction indicated by the arrow F, as shown in FIG. 1.

As long as the container can move freely, and therefore does not apply any excessive braking forces to the drive roller unit, the rotary movement of the first transmission wheel 48 is transmitted by way of the slipping clutch 50, in the manner of a rigid connection, to the second transmission wheel 48' which drives the second drive roller 1' in rotation in the same direction as the first drive roller 1.

The drive roller unit 99 according to the invention remains in the first operating condition as just described above, in which the two drive rollers 1 and 1' rotate at the same speed and in the same direction and thus drive the container 100 forwardly like a single drive roller, until the container opposes such high forces to the rotary movement of the two drive rollers 1 and 1' that the slipping moment of the slipping clutch 50 is exceeded. That occurs for example when the container 100 can no longer move in the direction indicated by the arrow F in FIG. 1 because its front end is bearing against the rear side wall 95 of the freight compartment 97, or a guide abutment arrangement mounted at that location. As soon as the forces acting on the second drive roller 1' at the container exceed the slip torque of the slipping clutch 50, the drive roller unit 99 changes over into the second operating condition in which the second drive roller 1' comes to a stop because the slipping clutch 50 cannot transmit a sufficiently high force from the first transmission wheel to the second transmission wheel, but changes over into the slipping condition. However the first drive roller continues with its rotary movement so that the drive roller unit 99 must now rotate about the vertical axis of its holding means 7 as the drive roller 1 is arranged eccentrically with respect to the axis of rotation 15 of the holding means 7. In that situation, in the plan view shown in FIGS. 1 and 2, the drive roller unit 99 rotates about the shaft 15 through a distance in the counter-clockwise direction. The new rotational position into which the drive roller unit moves and which is now directed in a counter-clockwise direction from the previous direction towards the longitudinal axis of the freight compartment means that the bottom of the container lying on the drive roller unit is acted upon by the forces in a direction which is turned in a counter-clockwise direction and in which the container is subjected to lower blocking or braking forces. As a result the container also applies lower reaction forces to the drive roller unit so that the forces involved again fall below the slipping torque of the slipping clutch 50 and the drive roller unit 99 goes back into its first operating condition. As a result, the two drive rollers 1 and 1' again begin to rotate in the same direction and at the same speed and drive the container 100 forwardly in the new inclined direction; when that happens, the container 100 slides with its right-hand front edge against the side wall 95 of the freight compartment and in so doing turns in the direction indicated by the arrows U, as shown in FIG. 2.

The container 100 is advanced in that fresh direction of movement by the drive roller 99 which operates in its first operating condition, until, with its right-hand front edge against the side wall 95, the container 100 is again subjected to such a strong braking effect that the drive roller 1' is again substantially braked in such a way that the drive roller unit 99 changes over into the second operating condition in the same manner as already described above. As a result, it again turns about its vertical axis over a further distance in a counter-clockwise direction. In the new rotational position, the braking effect of the container 100 again decreases and the drive roller unit 99 accordingly goes back into the first operating condition and drives the container 100 in the fresh rotational position until it is once again subjected to a substantial braking effect. The above-described change between the first and second operating conditions is repeated on a number of occasions until finally the longitudinal axis of the container 100 extends parallel to the longitudinal axis 94 of the aircraft or the rear side wall 95 thereof, and the container 100 can be unimpededly moved in that direction in the freight compartment 97 until it reaches the desired location.

When the supply of power to the electric motor means 25 is switched off, the rotor 27 comes to a stop and the roller carrier 5 and the drive rollers 1 and 1' mounted thereon move downwardly again, by virtue of their own eccentrically mounted weight, by a pivotal movement about the stator shaft 11 or the stub axle 10, into the rest position shown in FIG. 3 in which the drive rollers 1 and 1' are no longer pressed against the underside of the container 100.

The drive roller unit 99 can be moved back from its position in which it is now disposed substantially transversely with respect to the longitudinal axis 94 of the vehicle into its starting position, in any suitable fashion. There are a number of possible ways in which the man skilled in the art can attend to that. For example, the return rotary movement may be produced by means of a spring (not shown) which biases the drive roller unit 99 to cause it to return to the starting position shown in FIG. 1.

In the foregoing description and also in the diagrammatic view shown in FIG. 3, it has been assumed that a container is already lying on the drive roller unit when the latter is switched on. In that situation the drive rollers 1 and 1' are subjected to a sufficiently substantial braking effect to cause the drive rollers to pivot upwardly into the operative position and to be pressed up against the bottom of the container.

If in practice it is desired that that pivotal movement from the rest position into the working position is to occur even when there is no container resting on the drive roller unit, a brake may be provided between the holding means 7 and one of the two drive rollers 1' or 1, the brake then performing the same function as the container 100 when lying on the drive roller unit.

In the drive roller unit according to the invention, the planetary transmission which is referred to as a step-down transmission 30 performs a dual function. On the one hand, by acting as a step-down transmission 30, the planetary transmission reduces the high speed of rotation of the rotor 27 of the drive unit, while on the other hand it also ensures that the pivotal movement of the roller carrier 5 is produced when the electric motor means 25 is switched on, as was described hereinbefore.

A practical embodiment of a drive roller unit according to the invention, which is shown in simplified form in respect of many details, will now be described with reference to FIGS. 4 through 6. As this embodiment is similar in many structural details to the drive roller unit described in European patent application No. 89 102955.5, attention is hereby expressly directed to the disclosure of that European patent application, which is to be considered as a component part of the present description.

Figure 4:
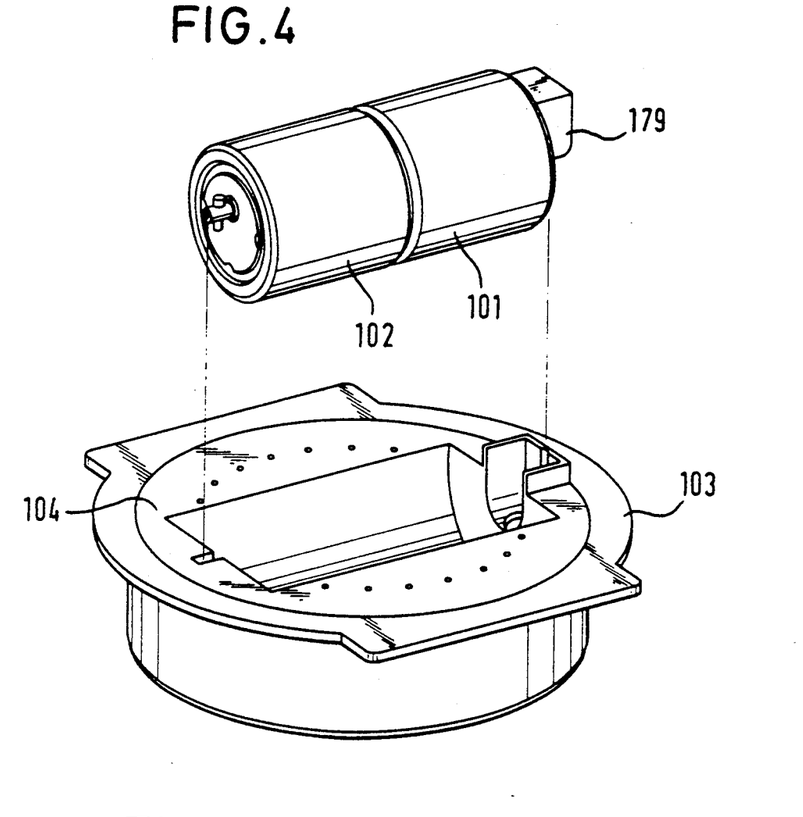
FIG. 4 is a perspective view of a practical embodiment of the drive roller unit, showing the assembly with enclosing drive rollers lifted out of the holding means.
Figure 5:
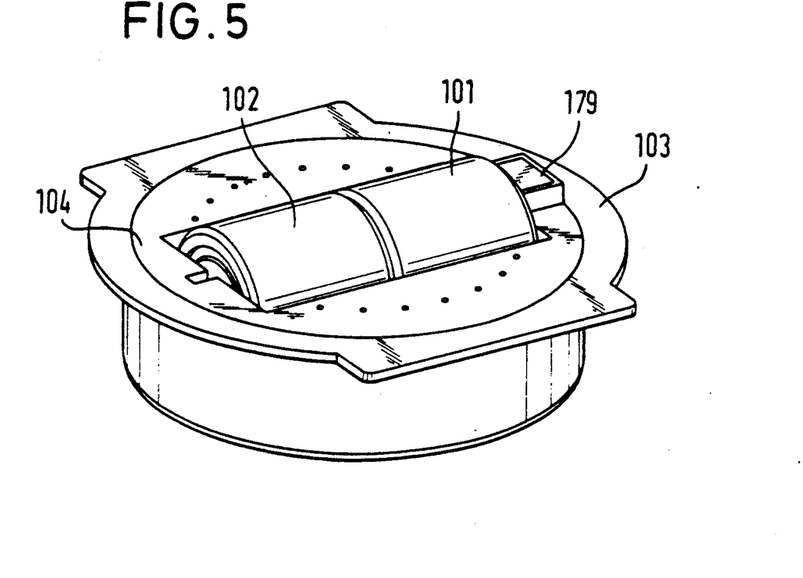
FIG. 5 shows the drive roller unit of FIG. 4 in the assembled condition.
Figure 6:
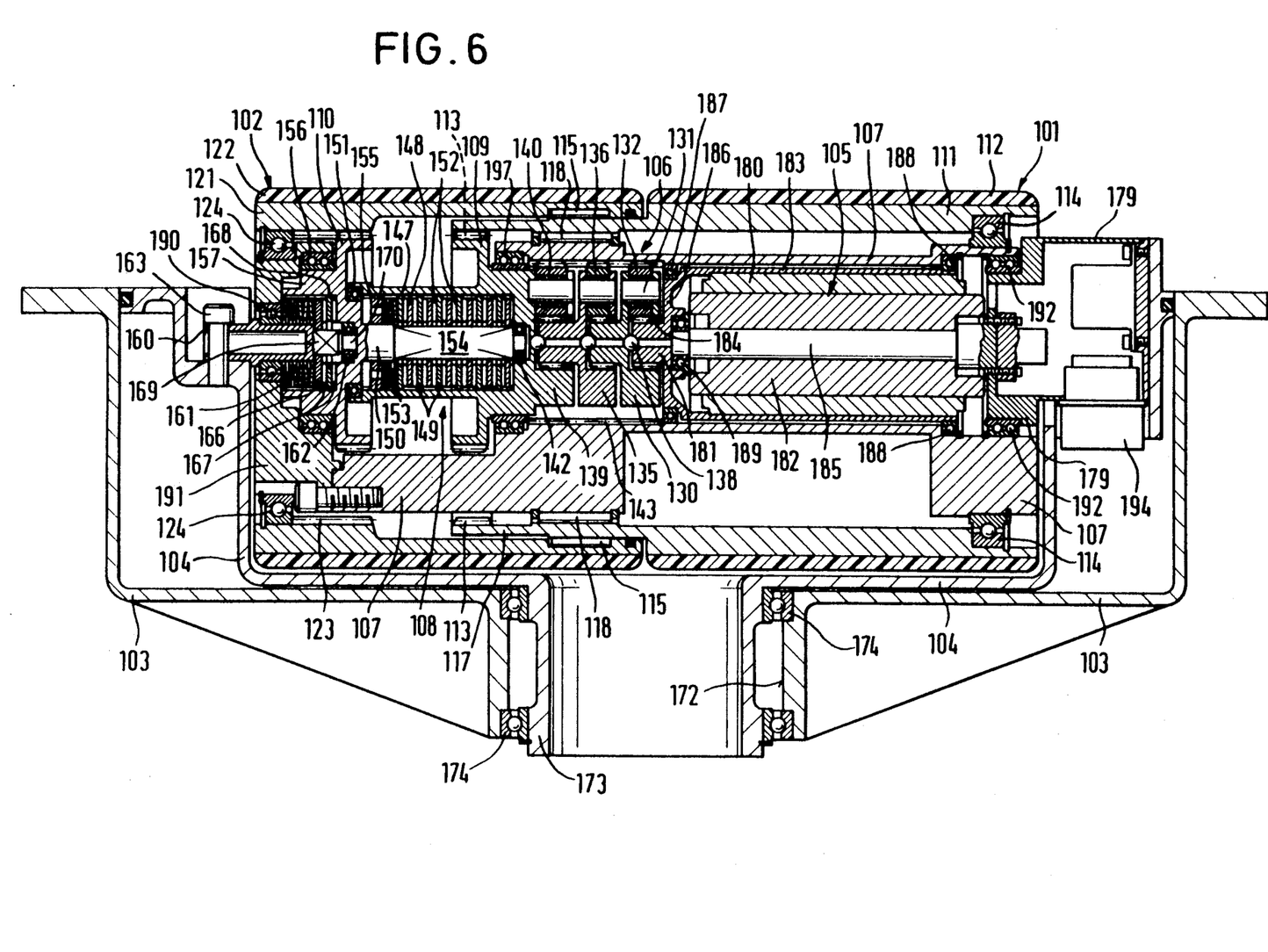
FIG. 6 is a view in axial section and simplified in regard to details, of a practical embodiment of the drive roller unit shown in FIGS. 4 and 5.

As shown in FIGS. 4 through 6, the drive roller unit has two drive rollers 101 and 102 of the same outside diameter, which are arranged in axially aligned mutually concentric relationship. The drive rollers 101 and 102 are mounted in a holding means 104 rotatably about their common horizontal axis. As FIGS. 4 and 5 show, the holding means 104 is of a circular configuration in plan view, and is mounted rotatably about a vertical axis in a housing 103 which serves as a base structure. The housing 103 is of a cup-like configuration and has a horizontal circumferential flange for anchoring it in an opening of a suitable configuration in the floor of a freight compartment. The holding means 104 has a centrally downwardly projecting mounting trunnion 173 which is mounted rotatably about a vertical axis in a central opening 172 in the housing 103, by means of two rolling bearings 174.

As is shown in particular in the view in axial longitudinal section in FIG. 6, the drive roller unit includes the two outer drive rollers 101 and 102 which are of substantially hollow-cylindrical configuration and which are arranged in axially juxtaposed relationship, an electric motor means 105 which is accommodated in the interior of the drive rollers 101 and 102, a step-down transmission 106 which axially adjoins the electric motor means 105 to the left thereof, and a slipping clutch 108 which in turn axially adjoins the step-down transmission 106 towards the left thereof.

The electric motor means 105 includes a stator 182 which contains a stator winding and which is fixedly connected to a stator shaft 185 carrying the stator 182. At its axial end which is at the right in FIG. 6, the stator shaft 185 is rigidly and non-rotatably secured to a connecting housing 179 which in turn is rigidly secured to the holding means 104 or is formed in one piece thereof. The field winding of the stator 182 is fixedly connected to the power supply means of the base structure by way of the connecting housing 179 which is provided with a plug 194.

The stator 182 is of a rotationally symmetrical configuration in conventional manner and is arranged concentrically in the interior of a rotor 180 which encloses it on the outside thereof. The rotor 180 is in turn enclosed by a rotor housing which is fixedly connected thereto and which is rotatably mounted by way of the rolling bearings 188 and 187 in a bore in a roller carrier 107 which encloses the motor means 105. At the axial end at the left in FIG. 6, the rotor housing 183 carries a radial mounting flange 186 which is rotatably mounted by means of a rolling bearing 189 on the left-hand axial end of the stator shaft 185. The arrangement of the bore in the roller carrier 107, which contains the electric motor means 105, is such that the axis of rotation of the rotor 180 and also the stator shaft are arranged eccentrically with respect to surface regions of the roller carrier 107, on which the two drive rollers 101 and 102 are rotatably mounted.

As mentioned above, the electric motor means is surrounded by a roller carrier 107 which is in the form of a hollow body and which contains not only the electric motor means 105 but also the step-down transmission 106, the slipping clutch 108 and a braking means which will be described in greater detail hereinafter. At its right-hand axial end in FIG. 6, the roller carrier 107 is rotatably mounted by means of the rolling bearing 192, concentrically with respect to the axis of rotation of the rotor shaft 181 of the electric motor means 105, at the connecting housing 179 which is fixedly connected to the holding means 104. At its left-hand axial end in FIG. 6, the roller carrier 107 is rotatably mounted by way of a rolling bearing 190 on a mounting trunnion 160 in concentric relationship with respect to the rotor shaft 181 of the electric motor means 105. The mounting trunnion 160 is rigidly and non-rotatably connected to the holding means 104 by means of a bolt 163. In that way the roller carrier 107 is rotatably mounted on the holding means 104, in eccentric relationship with the surface regions of the roller carrier 107, which mount the two drive rollers 101 and 102, so that it pivots upwardly in the manner of an eccentric when rotated.

The two drive rollers 101 and 102 are each substantially in the form of a hollow circular cylinder and concentrically enclose the roller carrier 107. The first drive roller 101 which is arranged at the right in FIG. 6 comprises a roller casing portion 112 of wear-resistant elastic material, and a roller body 111 of metal which carries the roller casing portion 112. At its region at the left in FIG. 6, the roller body 111 has a portion 117 of reduced diameter, with an internally toothed ring gear portion 113 being formed at the left-hand axial end at the inside of the reduced-diameter portion 117; the internally toothed ring gear portion 113 is either formed in one piece with the roller body 111 or is rigidly secured thereto. In the region of its reduced-diameter portion 117, the first drive roller 101 is mounted by means of a needle bearing 118 on the outside of the roller carrier 182 and at its axial end which is at the right in FIG. 6, it is mounted by a rolling bearing 114 on the outside surface, which is disposed therebeneath, of the roller carrier 107.

The second drive roller 102 which is shown at the left in FIG. 5 also comprises a roller casing portion 122 carried on a roller body 121. The materials used are the same as those used in the first drive roller 101. The roller body 121 of the second drive roller 102 has a portion of reduced thickness, which is shown at the right in FIG. 6 and with which the reduced-diameter portion 117 of the first drive roller 101 is in overlapping relationship. The roller body 121 is rotatably mounted by means of a needle bearing 115 on the outside of the reduced-diameter portion 117 of the first drive roller 101. At the end shown at the left in FIG. 6, the second drive roller 102 is rotatably mounted by means of a rolling bearing 124 on a radial mounting flange 191 which is fixedly connected to the roller carrier 107.

The two drive rollers 101 and 102 are therefore rotatably mounted in mutually concentric relationship on the roller carrier 107 and can perform a relative rotary movement relative to each other at the same time.

Starting from the rolling bearing 124 towards the right in FIG. 6, formed at the inside surface of the roller body 121 of the second drive roller 102 is an internally toothed ring gear portion 123 which is in meshing engagement with the second transmission wheel 110.

Disposed within the bore which passes eccentrically through the roller carrier, at the left in FIG. 6 of the mounting plate 106 which supports the rotor shaft 181, is a step-down transmission 106 in the form of a planetary transmission with three transmission stages which are disposed in succession in the axial direction of the assembly. That planetary transmission is of a conventional design configuration so that the following brief description will be sufficient for the man skilled in the art. Moreover the design configuration of the planetary transmission is similar to the planetary transmission as described in detail in European patent application No. 89 102955.5. The planetary transmission 106 includes, in the first stage which is shown at the right in FIG. 6, a first planet wheel carrier 130 on which three planet wheels 132 are rotatably mounted by means of shafts 131, although only one planet wheel 132 is shown in the drawing. The planet wheels 132 are in meshing engagement with a sun wheel of the first stage, which is formed by an external tooth configuration 184 on the left-hand axial end of the rotor shaft 181.

The sun wheel of the second transmission stage which is next following axially towards the left in FIG. 6 is formed in one piece with the planet carrier 130 of the first stage, in the form of an external tooth configuration. The planet carrier 135 of the second stage in turn carries planet wheels 136 which are rotatably mounted thereon by way of shafts 131 and which circulate in meshing engagement on the external tooth configuration on the first planet carrier 130 as the sun wheel of the second transmission stage.

The sun wheel of the third transmission stage is in turn in the form of an external tooth configuration on an extension portion, which extends axially towards the left, of the planet carrier 135 of the second transmission stage. The planet carrier 139 of the third transmission stage in turn carries planet wheels 140 which are rotatably mounted by way of shafts 131 and which circulate in meshing engagement on the external tooth configuration of the second planet carrier 135, in the form of the sun wheel of the third transmission stage.

Over the entire region of that step-down transmission 106, the inside wall of the eccentric bore extending through the roller carrier 107 is provided with an internal tooth configuration 143 which is in meshing engagement with the planet wheels 132, 136 and 140, as the crown wheel or ring gear of the planetary transmission.

For the purposes of reducing friction between the individual transmission stages, a respective bearing ball 138 is arranged in each case between the end of each sun wheel, which is towards the left in FIG. 6, and the next adjoining member of the assembly, for example the next planet carrier.

As shown in FIG. 6, the planet carrier 139 of the first transmission stage is extended axially towards the left to provide a tubular configuration. That tubular portion of the planet carrier 139 is mounted by means of the rolling bearing 197 at the inside surface of a portion of the roller carrier 107, which surrounds the above-mentioned tubular portion. At the left-hand end thereof, the tubular portion of the planet carrier is non-rotatably connected to the first transmission wheel 109, or is formed in one piece therewith. The first transmission wheel 109 is in meshing engagement with the internal ring gear portion 113 of the first drive roller 101.

The first drive wheel 109 is extended axially towards the left in FIG. 6, in the form of a tubular housing 147 of the slipping clutch 108, or is formed in one piece therewith. The tubular housing 147 of the slipping clutch 108 is provided in concentric relationship with the axis of rotation of the first transmission wheel 109.

The open end of the tubular housing 147, which is at the left in FIG. 6, is supported rotatably by way of a rolling bearing 151 on a bearing shoulder of the second transmission wheel 110 which adjoins same towards the left, in concentric relationship therewith. Projecting towards the right, the second transmission wheel 110 carries an axial shaft 150 which is fixedly connected to the second transmission wheel 110. The shaft 150 projects into the housing 147 of the slipping clutch 108 and is extended in the interior of the housing 147 in the form of a square or four-cornered portion 154 which finally terminates in a cylindrical projection portion which is rotatably mounted in the planet carrier 139 of the third transmission stage, by way of a bearing 142. In the interior of the housing 147, the portion 154 of the shaft 150 is surrounded by a plurality of radial clutch plates or discs 148 and 149 which are oriented parallel to each other. The clutch plates 148 are non-rotatably but axially displaceably mounted on the portion 154 while the clutch plates 149 which are arranged in alternate relationship with the clutch plates 148 are non-rotatably but axially displaceably coupled to the housing 147. Arranged between respective adjacent clutch plates is a respective plurality of coupling rollers which are uniformly distributed over the circumference of the clutch plates and which are arranged inclinedly with respect to the radii thereof. The pack comprising the clutch plates 148 and 149 and the coupling rollers 152 is pressed together towards the right by a spring means 153 in the form of diaphragm springs, wherein the spring force of the spring means 153 can be adjusted by means of a screw nut 155.

The second transmission wheel 110 has a hollow circumferential flange 157 which projects towards the left in FIG. 6 and in which there is provided a roller friction brake as described in a very similar design configuration in European patent application No. 89 102955.5. The roller friction brake produces a predeterminable and defined braking moment between the hollow circumferential flange 157 which is fixedly connected to the second transmission wheel 110, and the mounting trunnion 160 which is connected rigidly to the holding means 104. More specifically, the roller friction brake includes a brake disc or plate 168 which is mounted non-rotatably but axially displaceably on the second transmission wheel in the interior of the circumferential flange 157 and which, at its right-hand end face in FIG. 5, is supported by way of a plurality of brake rollers 167 against the end face, which is directed towards it, of the second transmission wheel 153. The end face of the brake disc or plate 168 which is at the left in FIG. 1 bears by way of a further number of brake rollers 167 against a pressure plate 166 which is non-rotatably but axially displaceably connected to the mounting trunnion 160. The pressure plate 166 is biased towards the right in the axial direction by way of a plurality of diaphragm springs 161 so that the pressure plate 166, the brake disc 168 and the brake rollers 167 are pressed against each other to produce a predetermined braking torque.

Finally, the mounting trunnion 160 is extended beyond its square or four-cornered portion 169 into a cylindrical projection portion 170 which is rotatably supported by means of a bearing 162 in a bore in the second transmission wheel 110, in order to reduce bending moments at the mounting trunnion 160. As the mode of operation of the above-described practical construction is identical to that of the construction diagrammatically shown in and described with reference to FIGS. 1 through 3, attention is directed to the description of the latter, in which respect it is merely also noted that the roller friction brake which is included in the embodiment shown in FIG. 6 and which has just been described above was omitted for the sake of simplicity from the diagrammatic view in FIG. 3. It will have been seen however that the foregoing description of FIG. 3 referred to the function which is performed by that roller friction brake, if the brake were to be provided in a specific situation of use of the unit.

It will be appreciated that the above-described constructions have been set forth solely by way of example and illustration of the present invention and that various alterations and modifications may be made therein without thereby departing from the spirit and scope of the invention.

What is claimed is:

1. A drive roller unit (99) for driving an article (100) on a conveyor track, comprising:
   first and second drive rollers (1, 1') arranged with their axes of rotation substantially transversely with respect to the direction of drive of the article (100) to be driven and in juxtaposed relationship in their axial direction, the drive rollers (1, 1') having a drive position in which they are in engagement with the underside of the article (100) to be driven; an electric motor means (25);

a transmission means (30, 48, 49, 48', 49') including a first transmission wheel (48) adapted to be driven by the electric motor means (25) and drivingly connected to the first drive roller (1) to drive same in rotation, and a second transmission wheel (48') drivingly connected to the second drive roller (1') to drive same in rotation;

a slipping clutch means (50) operatively coupling the second transmission wheel (48') to the first transmission wheel (48) for the selective transmission of drive to the second transmission wheel, the clutch torque of the slipping clutch means (50) being such that the drive rollers (1, 1') rotate in the same direction as long as the driven article (100) can move substantially unimpededly beyond the drive roller unit (99); and a holding means (7) which carries the drive rollers (1, 1') and which is mounted rotatably about a vertical axis (15) with respect to a base structure (18) of the conveyor track with which the drive roller unit (99) is adapted to be used.

2. A drive roller unit as set forth in claim 1 wherein the slipping clutch (50) comprises a roller friction clutch having a plurality of clutch plates (51, 52) which are rotatable relative to each other, the clutch plates (51, 52) which are successively adjacent in the axial direction being alternately non-rotatably connected to the first transmission wheel (48) and the second transmission wheel (48') respectively and a respective plurality of circumferentially distributed coupling rollers (56) disposed between mutually adjacent clutch plates (51, 52), the rollers (56) each being arranged at an angle inclinedly with respect to the radial direction of the clutch plates (51, 52), and a spring means (57) axially pressing the clutch plates (51, 52) and the coupling rollers (56) arranged therebetween together.

3. A drive roller unit as set forth in claim 1 wherein the axes of rotation of the drive rollers (1, 1') are parallel to each other.

4. A drive roller unit as set forth in claim 3 wherein the axes of rotation of the drive rollers (1, 1') are disposed in mutually aligned coaxial relationship and the drive rollers (1, 1') have the outside shape of circular cylinders of the same diameter.

5. A drive roller unit as set forth in claim 1 wherein the drive rollers are in the form of hollow bodies and the electric motor means the transmission means and the slipping clutch are arranged in the interior of the drive rollers.

6. A drive roller unit as set forth in claim 1 wherein the first drive roller (1) has an internally toothed ring gear means (49), the first transmission wheel (48) is in the form of a gear wheel connected to the input of the slipping clutch (50) and meshes with the internally toothed ring gear means (49) of the first drive roller (1), the second drive roller (1') has an internally toothed ring gear means (49'), the second transmission wheel (48') is in the form of a gear wheel connected to the output of the slipping clutch means (50) and meshes with the internally toothed ring gear means (49') of the second drive roller (1'), the electric motor means has a rotor (27) and the transmission means include a step-down transmission portion (30) operatively connecting said rotor (27) to said first transmission wheel (48).

7. A drive roller as set forth in claim 1 wherein the drive roller unit (99) is so designed that, when the electric motor means (25) is switched on, the drive rollers (1, 1') of the drive roller unit automatically rise out of a lower rest position into an upper drive position in which they are in engagement with the underside of the article (100) to be driven.

8. A drive roller unit as set forth in claim 1 wherein the electric motor means (25) comprises a rotatably supported rotor (25) and a stator (26) which is arranged in concentric relationship within the rotor (27) and is rigidly and non-rotatably connected to the holding means (7).

9. A drive roller unit as set forth in claim 7 including a roller carrier (5) on which the drive rollers (1, 1') are rotatably mounted and which is rotatably mounted on said holding means (7) about an axis which is eccentric with respect to the axis of rotation of the drive rollers (1, 1') wherein said transmission means comprises a planetary transmission means (30) having an input (31) and first and second outputs (33, 36), the electric motor means (25) is drivingly connected to the input (31) of the planetary transmission means (30), the first output (33) of the planetary transmission means (30) is drivingly connected to the first transmission wheel (48) and the second output (36) is adapted to drive in rotation said roller carrier (5).

10. A drive roller unit as set forth in claim 9 wherein said input (31) of the planetary transmission means (30) is a sun wheel (31) which is non-rotatably connected to the rotor shaft (14) of the electric motor means (25), the one output (33) of the planetary transmission means (30) is a planet carrier (33) which is non-rotatably connected to the first transmission wheel (48), and the output (36) is an internally toothed ring gear means (36) which is non-rotatably disposed on the roller carrier (5) and which represents the ring gear of the planetary transmission means (30).

* * * * *